*INVENTOR.*
ROBERT F. WRENCH
BY Walter S. Zebrowski
ATTORNEY

April 21, 1970     R. F. WRENCH     3,507,651
STENCIL SCREEN AND METHOD
Filed Dec. 29, 1966     3 Sheets-Sheet 3

*INVENTOR.*
ROBERT F. WRENCH
BY *Walter S. Zebrowski*
ATTORNEY

United States Patent Office 3,507,651
Patented Apr. 21, 1970

3,507,651
STENCIL SCREEN AND METHOD
Robert F. Wrench, Corning, N.Y., assignor to Corning Glass Works, Corning, N.Y., a corporation of New York
Filed Dec. 29, 1966, Ser. No. 605,748
Int. Cl. G03c 5/00
U.S. Cl. 96—36.4               10 Claims

ABSTRACT OF THE DISCLOSURE

Stencil screens used for printing and a direct, single exposure method of producing stencil screens which provide good print definition and economy are described. The photosensitive emulsion which forms the stencil screen blockage is applied to a smooth, flat surface and is then caused to permeate a screen to form an assembly. After the emulsion is dried while in contact with such smooth, flat surface, the screen and emulsion is removed. Thereafter, a photographic positive or the like is disposed adjacent the smooth emulsion whereupon the emulsion is exposed to light, the positive removed, and the emulsion developed.

BACKGROUND OF THE INVENTION

Stencil screens, commonly referred to as silk screens, have heretofore been fabricated by a method which requires the application of a coating of a photosensitive emulsion to a prestretched screen, which coating is thereafter dried under ambient conditions. Such drying causes the emulsion to shrink and assume the contour of the screen fibers. A photographic positive is formed having an opaque area, corresponding to the information to be printed by the screen, surrounded by a transparent area. The positive is then placed against the back side of the screen and the assembly is subjected to a suitable light which passes through the transparent portion of the positive and exposes the photosensitive emulsion applied to the screen. The positive is thereafter removed and the emulsion on the screen is developed so that the unexposed portion of the emulsion, corresponding to the information to be printed, is washed out leaving an open area in the screen through which the printing medium can thereafter pass.

Stencil screens formed by this method permit formation of line widths which are limited to about 5 mils, which lines can be fabricated to a tolerance of only about ±1.5 mils. In addition, such stencil screens often result in printed line edges having a pronounced sawtooth effect. Further, the emulsion contains craters and pits in the printing surface due to the slow drying of the photosensitive emulsion contributing to the relatively poor quality of the resulting printed matter.

SUMMARY OF THE INVENTION

The objects of the present invention are to provide an economic stencil screen having an emulsion, the printing surface of which is more crater and pit free, and a method of fabricating such a screen that overcomes the heretofore noted disadvantages whereby smooth edged lines can be printed having small widths and spacing therebetween as well as having improved dimensional tolerance.

According to the present invention, a stencil screen may be formed by applying a coating of a photosensitive emulsion onto a flat, smooth surface, disposing a surface of a prestretched screen over said emulsion causing the emulsion to permeate the screen, drying the emulsion while in contact with said surface, removing the screen and emulsion from said surface, providing a member having an opaque first area corresponding to that of the desired print surrounded by a light transmitting second area, disposing said member adjacent the smooth emulsion, illuminating said emulsion through the member with a suitable light thereby exposing an area of the emulsion corresponding to the transparent second area while leaving an area of the emulsion corresponding to the opaque first area substantially unexposed, removing said member, and thereafter removing the unexposed portion of the emulsion.

Additional objects, features, and advantages of the present invention will become apparent, to those skilled in the art, from the following detailed description and the attached drawing, on which, by way of example, only the preferred embodiments of this invention are illustrated.

DETAILED DESCRIPTION

By the term stencil screen as used herein is meant a stretched screen, having a substantially impermeable emulsion applied to a portion thereof while the balance is uncoated permitting a printing medium to pass through, at least a portion of which balance corresponds in shape and configuration to that which is desired to be printed.

By the term printing as used herein is meant to form an impression or print of letters, characters, patterns, designs, artwork, and the like of any desired shape and configuration on any substrate.

By the term screen as used herein is meant a mesh, fabric or cloth formed of any weavable material such as silk, nylon, Dacron, and the like fibers as well as metal wires such, for example, as stainless steel.

Figure 1:
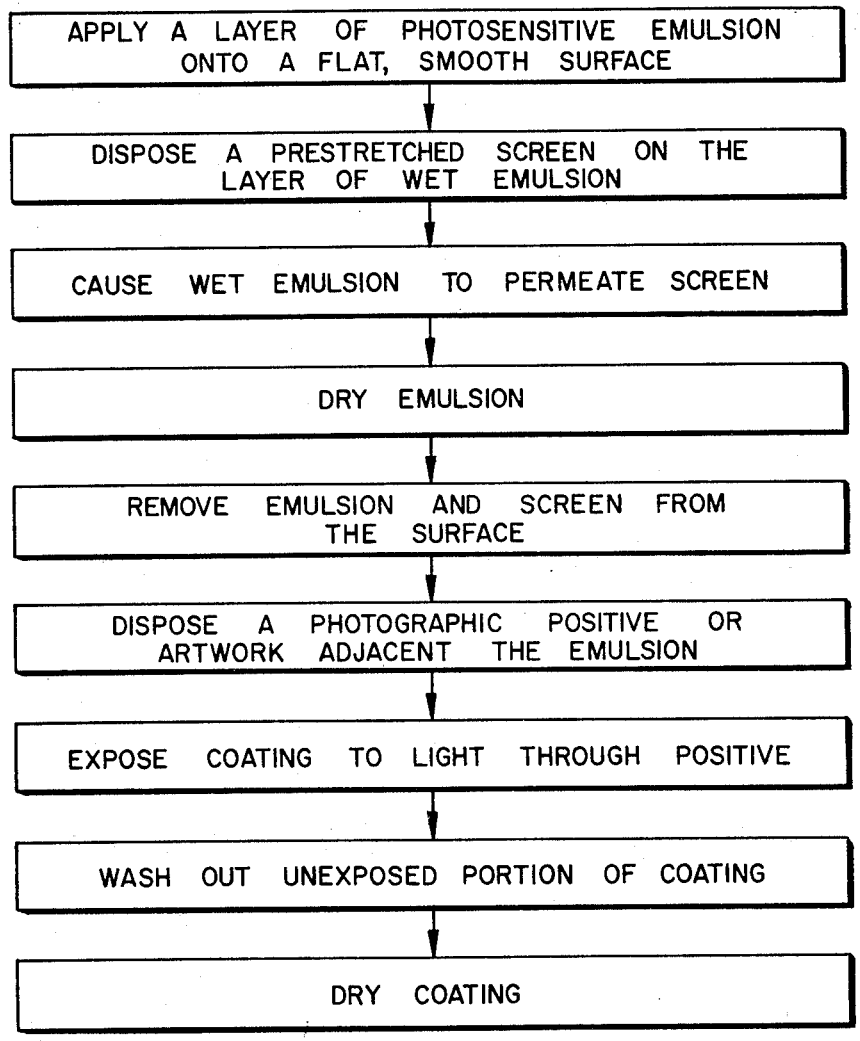
FIGURE 1 is a flow diagram illustrating the steps of the method of this invention.
Figure 2:
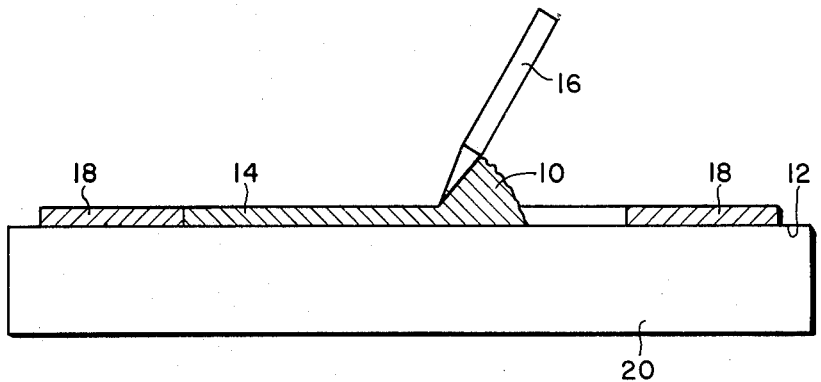
FIGURES 2–4 are diagrammatic views illustrating some of the various steps of one embodiment of this invention.

In accordance with this invention a quantity of photosensitive emulsion 10 is applied over a smooth, flat surface 12 by any suitable means to produce a layer 14 thereof. One such means may be a squeegee or doctor blade 16 as shown in FIGURE 2. A knife coating apparatus is also suitable for this purpose. Shims 18 or the like may be employed to obtain a uniform layer 14. Surface 12 may be one surface of a body 20 of plate glass, or any other smooth, flat, rigid member such as plastic. Surface 12 must be such as to permit the subsequently applied emulsion to be removed therefrom. It, therefore, may be necessary to apply to surface 12 a suitable release agent such as a sheet of synthetic resinous material, as for example, Mylar or the like. Mylar is a polyester material. Such a release agent must be smooth and wettable by a photosensitive emulsion. Suitable examples of photosensitive emulsions are sensitized polyvinyl alcohol, sensitized polyvinyl acetate, sensitized gelatin or the like, which hereinafter will simply be referred to as polyvinyl alcohol, polyvinyl acetate, gelatin, or the like.

It should be noted that after layer 14 is applied to surface 12, the layer may be inspected, if the material of body 20 is transparent or translucent, by directing a photographically safe light through body 20 and layer 14. Such defects as lint, bubbles, and the like may be removed before the emulsion is adhered to a screen as hereinafter described.

Figure 3:
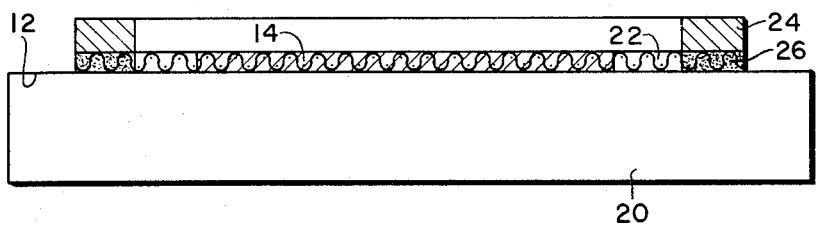

While the emulsion of layer 14 is still wet shims 18 are removed either in whole or in part, if they are employed, and a prestretched screen 22 is disposed on layer 14 so that the wet emulsion is caused to permeate the screen as illustrated in FIGURE 3. In order to prevent the screen from coming to rest on surface 12 as layer 14 is caused to permeate it, shims having a thickness somewhat less than shims 18 may be disposed about the periphery of layer 14 so that the screen is maintained from surface 12 by the thickness of such second shims. This can be accomplished by having shims 18 composed of several thin sheets, of which only a portion is removed before screen 22 is disposed over layer 14.

Figure 4:

Screen 22 is prestretched and maintained in place by bonding it to a suitable frame 24 by any suitable cement 26 such for example as epoxy cement, as is well known to one familiar with the art. The permeated screen is then permitted to dry while the emulsion is in contact with surface 12. Thereafter, screen 22 together with emulsion layer 14 are removed from surface 12, as shown in FIGURE 4, producing the ultimate printing surface 28 on the emulsion layer.

Figure 5:
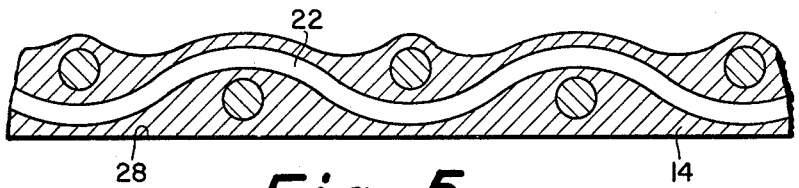
FIGURE 5 is a fragmentary cross sectional view of a screen before illuminating.

Referring to FIGURE 5, a greatly enlarged view of a screen is illustrated where the ultimate printing surface 28 is shown flat and smooth. As is seen, the back side of the emulsion shrinks somewhat when it dries and tends to assume the contour of the screen fibers. If the emulsion was dried without being adhered to smooth, flat surface 12, the emulsion would dry and shrink from both sides whereby the emulsion on the printing surface would also tend to assume the contour of the screen fibers causing relatively poor quality of the resulting printed matter.

Figure 6:
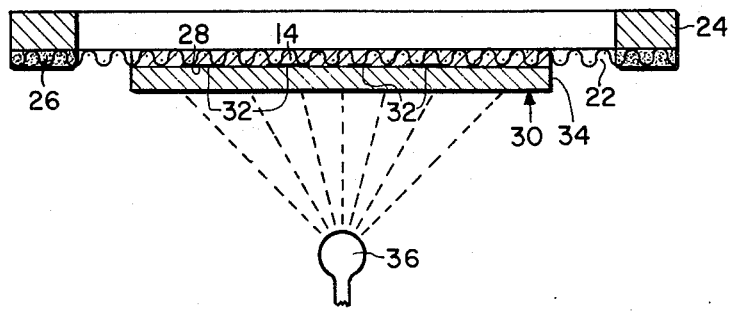
FIGURES 6–8 are diagrammatic views illustrating the remaining steps of one embodiment of this invention.

A photographic positive 30 or the like having an opaque area 32 of substantially the same configuration as that which is desired to be printed is provided and disposed adjacent surface 28 of layer 14 as illustrated in FIGURE 6. Opaque areas 32 of photographic positive 30 may be formed of a common photographic emulsion applied to an ordinary plastic backing 34. The assembly so formed is exposed to a suitable light 36 to expose that portion of coating 14 which surrounds opaque areas 32 as shown in FIGURE 6. Light 36 is schematically illustrated. While any carbon arc lamp or an ultraviolet light source may be used for this purpose, a collimated light is preferred. The length of time for the exposure of coating 14 will depend on the thickness of the coating as well as the composition thereof.

Figure 7:
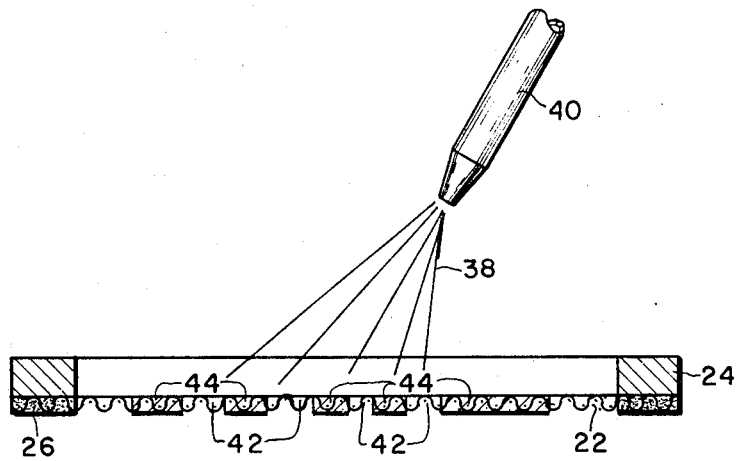

Referring now to FIGURE 7, the assembly is subjected to a water spray 38 supplied by any suitable means such as nozzle 40 to wash out the unexposed portions of the coating 14. After the unexposed portions of the coating are washed out leaving channels 42 in between remaining portions 44 of coating 14, the assembly is again dried. If desired, a water bath may be used to aid in washing out the unexposed portions of the coating as is well understood by one familiar with the art. Such a water bath may be ultrasonically agitated if desired. Also, the assembly may first be flooded prior to washing out with spray 38 by subjecting it to a gentle stream of water.

Figure 8:
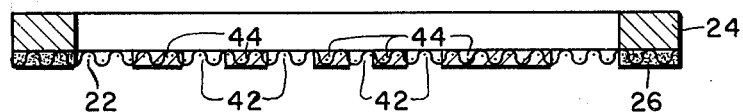

The exposed portions 44 remaining are then dried resulting in a finished stencil screen as illustrated in FIGURE 8.

A typical example of one method of carrying out the present invention is illustrated by the following description. A sheet of flat plate glass having a size greater than the ultimate screen is provided. A Mylar polyester material sheet is attached to one surface of such glass plate by means of a waterproof tape to form a suitable release agent. Shims are disposed on the surface of said glass having a total thickness of about 5 mils. Thereafter, a layer of polyvinyl alcohol, a photosensitive emulsion, is applied to the surface of said glass by means of a doctor blade gliding on said shims. The resulting layer of emulsion has about the same thickness as that of the shims.

A prestretched screen is formed by providing a metallic frame having at least one flat surface, adjacent to which a nylon screen is disposed. The screen is stretched in all directions and bonded to the frame by means of an epoxy cement, which cement is thereafter permitted to dry while tension is maintained on the screen.

While the layer of emulsion is still wet, a portion of the shims are removed leaving shims having a thickness of about 2 mils and the prestretched screen is disposed over it causing the emulsion to permeate the screen. The screen comes to rest on the remaining shims thereby being maintained from the surface of the glass plate. Thereafter, the emulsion and screen assembly is allowed to dry for about 4 hours while in contact with the smooth glass surface. After the emulsion is dried the assembly is removed from the glass surface leaving a flat, smooth surface on the printing side of the emulsion.

A photographic positive having an opaque first area corresponding to that of the desired print or impression surrounded by a light transmitting second area is provided and disposed adjacent the smooth surface of the layer of emulsion on the screen.

The layer of emulsion is then exposed to a collimated carbon arc light for about 60 seconds through the positive. In this manner the light passes through the positive and exposes only that portion of the polyvinyl alcohol which surrounds the opaque areas of the positive.

The screen assembly is then soaked in water having a temperature of about 110° F. for approximately 15 seconds and the unexposed portion of the emulsion layer is washed out by means of a water stream or spray. A water spray from a nozzle is directed to the screen so that sufficient force is developed to wash out all of the unexposed portion of the emulsion layer. After all of the unexposed emulsion is removed, the surface water is thoroughly blotted with a chamois from the back side of the screen. The assembly is then permitted to dry for about sixteen hours at room temperature. After the assembly is thoroughly dried the screen is completed.

A screen produced as described in the typical example is capable of printing fine lines of a slurry of electrically conductive material.

It is obvious that a stencil screen formed by the method of this invention is suitable for printing microcircuit paths, decorative artwork, ordinary printing matter, or the like.

Although the present invention has been described with respect to the specific details of certain embodiments thereof, it is not intended that such details be limitations upon the scope of the invention except insofar as set forth in the following claims.

What is claimed is:

1. A method of forming a stencil screen comprising the steps of:
   applying a layer of photosensitive emulsion onto a flat surface,
   disposing a prestretched screen on said layer and causing said emulsion to permeate said screen,
   drying said emulsion while in contact with said flat surface,
   removing said emulsion and screen from said surface,
   disposing a member having an opaque first area corresponding to that of the print desired surrounded by a light transmitting second area adjacent said surface side of said layer of emulsion,
   illuminating the assembly so formed with a suitable light thereby exposing an area of said layer of emulsion corresponding to said light transmitting area while leaving the area thereof corresponding to said opaque area substantially unexposed,
   removing said member, and thereafter
   removing the unexposed portion of said layer of emulsion.

2. The method of claim 1 wherein said member is a photographic positive.

3. The method of claim 1 wherein said photosensitive emulsion is polyvinyl alcohol.

4. The method of claim 3 wherein said light is ultraviolet light.

5. The method of claim 1 wherein said unexposed portion of said layer of emulsion is removed by washing out with water.

6. The method of claim 5 further comprising the step of drying the remaining emulsion after said unexposed portion has been washed out.

7. The method of claim 6 wherein said member is a photographic positive.

8. The method of claim 7 wherein said photosensitive emulsion is polyvinyl alcohol.

9. The method of claim 8 wherein said light is ultraviolet light.

10. The screen formed by the method of claim 1.

References Cited

UNITED STATES PATENTS 2,094,025  9/1937  Scantlebury _____ 96—36.4

FOREIGN PATENTS 942,824  11/1963  Great Britain.

GEORGE F. LESMES, Primary Examiner

J. P. BRAMMER, Assistant Examiner

U.S. Cl. X.R.

101—128.3